US008290851B2

(12) United States Patent  (10) Patent No.: US 8,290,851 B2
Deitz et al.  (45) Date of Patent: Oct. 16, 2012

(54) SYSTEM AND METHOD FOR MANAGEMENT AND ANALYSIS OF ELECTRONIC TRADE ORDERS

(75) Inventors: Alexander D. Deitz, Chicago, IL (US); Sagy P. Mintz, Lincolnshire, IL (US)

(73) Assignee: Trading Technologies International, Inc., Chicago, IL (US)

( * ) Notice: Subject to any disclaimer, the term of this patent is extended or adjusted under 35 U.S.C. 154(b) by 54 days.

(21) Appl. No.: 12/844,645

(22) Filed: Jul. 27, 2010

(65) Prior Publication Data

US 2010/0293088 A1  Nov. 18, 2010

Related U.S. Application Data

(63) Continuation of application No. 11/689,178, filed on Mar. 21, 2007, now Pat. No. 7,788,167.

(51) Int. Cl.
G06Q 40/00 (2006.01)

(52) U.S. Cl. .................................. 705/37; 705/36 R

(58) Field of Classification Search ........................ None
See application file for complete search history.

(56) References Cited

U.S. PATENT DOCUMENTS

| | | | |
|---|---|---|---|
| 6,772,132 B1 | 8/2004 | Kemp, II et al. | |
| 6,938,011 B1 | 8/2005 | Kemp, II et al. | |
| 6,996,535 B1 | 2/2006 | Ono et al. | |
| 7,113,924 B2* | 9/2006 | Fishbain | 705/37 |
| 7,117,833 B2 | 10/2006 | Spath et al. | |
| 7,127,424 B2 | 10/2006 | Kemp, II et al. | |
| 7,228,289 B2 | 6/2007 | Brumfield et al. | |
| 7,299,208 B1 | 11/2007 | Bailon et al. | |
| 7,389,258 B2 | 6/2008 | Brumfield et al. | |
| 7,389,264 B2* | 6/2008 | Kemp et al. | 705/37 |
| 7,389,268 B1 | 6/2008 | Kemp, II et al. | |
| 7,437,325 B2* | 10/2008 | Kemp et al. | 705/37 |
| 7,523,064 B2* | 4/2009 | Burns et al. | 705/37 |
| 7,542,937 B1* | 6/2009 | Cohen | 705/37 |
| 7,672,896 B2* | 3/2010 | Burns et al. | 705/37 |
| 7,734,532 B2* | 6/2010 | Fishbain | 705/37 |
| 7,747,510 B1* | 6/2010 | Burns et al. | 705/37 |
| 2002/0091611 A1* | 7/2002 | Minton | 705/37 |
| 2002/0120555 A1 | 8/2002 | Lerner | |

(Continued)

FOREIGN PATENT DOCUMENTS

WO  WO02099566  12/2002

(Continued)

OTHER PUBLICATIONS

Schneider, Ivan. "SWIFT Strategist Plots Course for MiFID." Journal of Bank Systems & Technology. vol. 43, No. 2, pp. 13. © 2006.*

(Continued)

Primary Examiner — Robert Niquette
(74) Attorney, Agent, or Firm — McDonnell Boehnen Hulbert & Berghoff LLP

(57) ABSTRACT

A system and methods are provided for using order descriptor identifiers in relation to orders being used in trading strategies. According to one example method, when a hedge order is submitted upon detecting a fill of another order, the hedge order includes one or more order descriptor identifiers conveying a purpose of the hedge order to a user. The order descriptor identifiers can be used to search for desired orders and perform more effective order management and post trade analysis.

24 Claims, 5 Drawing Sheets

U.S. PATENT DOCUMENTS

| | | | |
|---|---|---|---|
| 2003/0083978 A1 | 5/2003 | Brouwer | |
| 2003/0110113 A1* | 6/2003 | Martin | 705/36 |
| 2003/0200167 A1* | 10/2003 | Kemp et al. | 705/37 |
| 2003/0233309 A1* | 12/2003 | Matus et al. | 705/37 |
| 2003/0236737 A1* | 12/2003 | Kemp et al. | 705/37 |
| 2004/0111619 A1 | 6/2004 | Laurie et al. | |
| 2004/0267655 A1* | 12/2004 | Davidowitz et al. | 705/37 |
| 2005/0027635 A1 | 2/2005 | Monroe et al. | |
| 2005/0171887 A1 | 8/2005 | Daley et al. | |
| 2005/0222936 A1* | 10/2005 | Panariti et al. | 705/37 |
| 2006/0015436 A1* | 1/2006 | Burns et al. | 705/37 |
| 2006/0031156 A1 | 2/2006 | Noviello et al. | |
| 2006/0085320 A1 | 4/2006 | Owens et al. | |
| 2006/0167788 A1 | 7/2006 | Tilly et al. | |
| 2006/0167789 A1 | 7/2006 | Tilly et al. | |
| 2006/0259396 A1 | 11/2006 | Burns et al. | |
| 2006/0259400 A1 | 11/2006 | Monroe et al. | |
| 2006/0259403 A1* | 11/2006 | Monroe et al. | 705/37 |
| 2007/0027788 A1 | 2/2007 | Bandman et al. | |
| 2007/0061233 A1* | 3/2007 | Jovanovic et al. | 705/36 R |
| 2007/0078749 A1 | 4/2007 | Burns et al. | |
| 2007/0078752 A1* | 4/2007 | Burns et al. | 705/37 |
| 2007/0156574 A1* | 7/2007 | Marynowski et al. | 705/37 |
| 2007/0226122 A1 | 9/2007 | Burrell et al. | |
| 2007/0244792 A1* | 10/2007 | Couperier et al. | 705/37 |
| 2007/0294160 A1* | 12/2007 | Brown et al. | 705/37 |
| 2008/0077521 A1* | 3/2008 | Sibley et al. | 705/37 |
| 2010/0299243 A1* | 11/2010 | Chiulli et al. | 705/37 |
| 2011/0145124 A1* | 6/2011 | Rooney | 705/37 |
| 2011/0145165 A1* | 6/2011 | Haldes et al. | 705/36 R |

FOREIGN PATENT DOCUMENTS

WO     WO 03/090032    * 10/2003

OTHER PUBLICATIONS

Schneider, I. Swift Strategist Plots Course for MiFD. Copyright 2006. Journal of Bank Systems & Technology, vol. 43, No. 2, pp. 13.

* cited by examiner

SYSTEM AND METHOD FOR MANAGEMENT AND ANALYSIS OF ELECTRONIC TRADE ORDERS

CROSS-REFERENCE TO RELATED APPLICATION

This application is a continuation of U.S. patent application Ser. No. 11/689,178, filed on Mar. 21, 2007 and entitled "System and Method for Management and Analysis of Electronic Trade Orders," now issued as U.S. Pat. No. 7,788,167, the contents of which are hereby incorporated by reference.

TECHNICAL FIELD

The present invention is directed to order tracking and management in an electronic trading environment. More specifically, the present invention is directed to a system and method for marking orders with order descriptor identifiers and using the order descriptor identifiers for order management and post-trade analysis.

BACKGROUND

Electronic trading is generally based on a host exchange, one or more computer networks, and client devices. In general, the host exchange includes one or more centralized computers to form the electronic heart. Its operations typically include maintaining an exchange order book that records unexecuted orders, order matching, providing price and order fill information, and managing and updating a database that records such information. The host exchange is also equipped with an external interface that maintains contact to the client devices and possibly other trading-related systems.

Sometimes, on their machines, traders use automated or semi-automated trading tools, collectively hereinafter referred to as automated tools that automatically or semi-automatically send orders to the exchange. Such trading tools are usually provided, among other things, to facilitate fast and accurate order entry. For instance, an automated tool might quickly calculate one or more order parameters, such as order price or order quantity, based on market conditions, or some other reference condition, and then automatically send an order with these parameters to an exchange for matching. According to many existing and popular exchanges today, orders are electronically entered in an exchange order book in the sequence in which they are received (a first-in, first-out, commonly referred to as FIFO matching system). Based on this sequence, and the availability of market quantity, orders are filled with priority given to the first order entered, then the second (next) order entered, and so forth. It should be understood that different variations of FIFO or different matching systems altogether can be used as well.

In addition to trading individual tradable objects, many traders often implement trading strategies that involve simultaneous trading of two or more tradable objects. One such trading strategy is commonly referred to as spread trading. In general, spread trading is the buying and/or selling of one, two, or more tradable objects, one purpose of which is to capitalize on changes or movements in the relationships between the tradable objects. The tradable objects that are used to complete a spread are referred to as the outright markets or legs of the spread. A spread trade involves buying tradable objects, buying and selling tradable objects, selling tradable objects or some combination thereof.

As used herein, the term "tradable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable objects, such as a class of tradable objects.

A commercially available trading tool that facilitates the automatic trading of spreads is Autospreader™ from Trading Technologies International, Inc. of Chicago, Ill. Once the legs of the spread are chosen and the relationship between them are defined, a user can input a desired spread price and quantity, and the Autospreader™ will automatically work orders in the legs to achieve the desired spread (or attempt to achieve the spread). The Autospreader™ is currently an add-on tool available with X_TRADER® Pro™, which is a trading application also available from Trading Technologies International, Inc.

U.S. patent application Ser. No. 10/137,979, entitled "System and Method for Performing Automatic Spread Trading," filed on May 3, 2002, which issued as U.S. Pat. No. 7,437,325 on Oct. 14, 2008, the contents of which are fully incorporated by reference herein, describes an automated spread trading tool. An example also is provided herein to illustrate how an automated spread trading tool like that described in the above incorporated application might work. While the example illustrates hedging in a related tradable object, the same concepts can be similarly applied to hedging in the same tradable object.

Typically, when a trader enters a desired spread order price based on the provided spread data, an automated spread trading tool will use spread setting parameters defined by the trader to place an order in the legs of the spread. As the markets in each leg move, individual spread leg orders are re-priced by an automated spread trading tool to achieve the desired price defined for a synthetic spread. Re-pricing of orders generally involves sending a change request to the exchange, where the change request defines a new price for the order. Alternatively, a cancel/replace request could be used to re-price orders pending at exchanges that do not support change requests. As one of the orders of the spread fills, one or more other orders that fill subsequently function as offset (hedge) orders. In an alternative embodiment, rather than having all spread orders simultaneously working in each leg of the spread, a spread trading tool could enter one or more offset orders upon detecting a fill in one of the legs of the spread.

While spread trading is one trading strategy where hedge orders are used, there are many other manual or automated trading strategies where hedge orders are sent upon detecting a fill in the same or different tradable object. It is desirable to offer tools that can assist a trader in trading in an electronic trading environment, and specifically in tracking orders entered in relation to trading strategies.

SUMMARY

The example embodiments are directed to a system and methods for using order descriptor identifiers in relation to orders that are sent for a trading strategy, such as a spread trading strategy.

According to one example method for use in relation to spread trading strategies, when a hedge order is generated upon detecting a fill of another order, the hedge order is marked with one or more globally accessible order descriptor identifiers. The order descriptor identifier conveys the purpose of the hedge order, such as by using a hedge order flag, and adds some other descriptor data that can be later used for order management and post-trading analysis. Because the order descriptor identifiers are built into the order, they can be accessed not only by the sending application but also other applications as well.

While the example embodiments are described herein with reference to illustrative embodiments for particular applications, it should be understood that the example embodiments are not limited thereto. For instance, it should be understood that the system and methods of the present embodiments can be applied by other software applications outside of the trading environment. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

BRIEF DESCRIPTION OF THE DRAWINGS

Example embodiments are described herein with reference to the following drawings, in which.

DETAILED DESCRIPTION

I. A First Example Trading System

Figure 1:
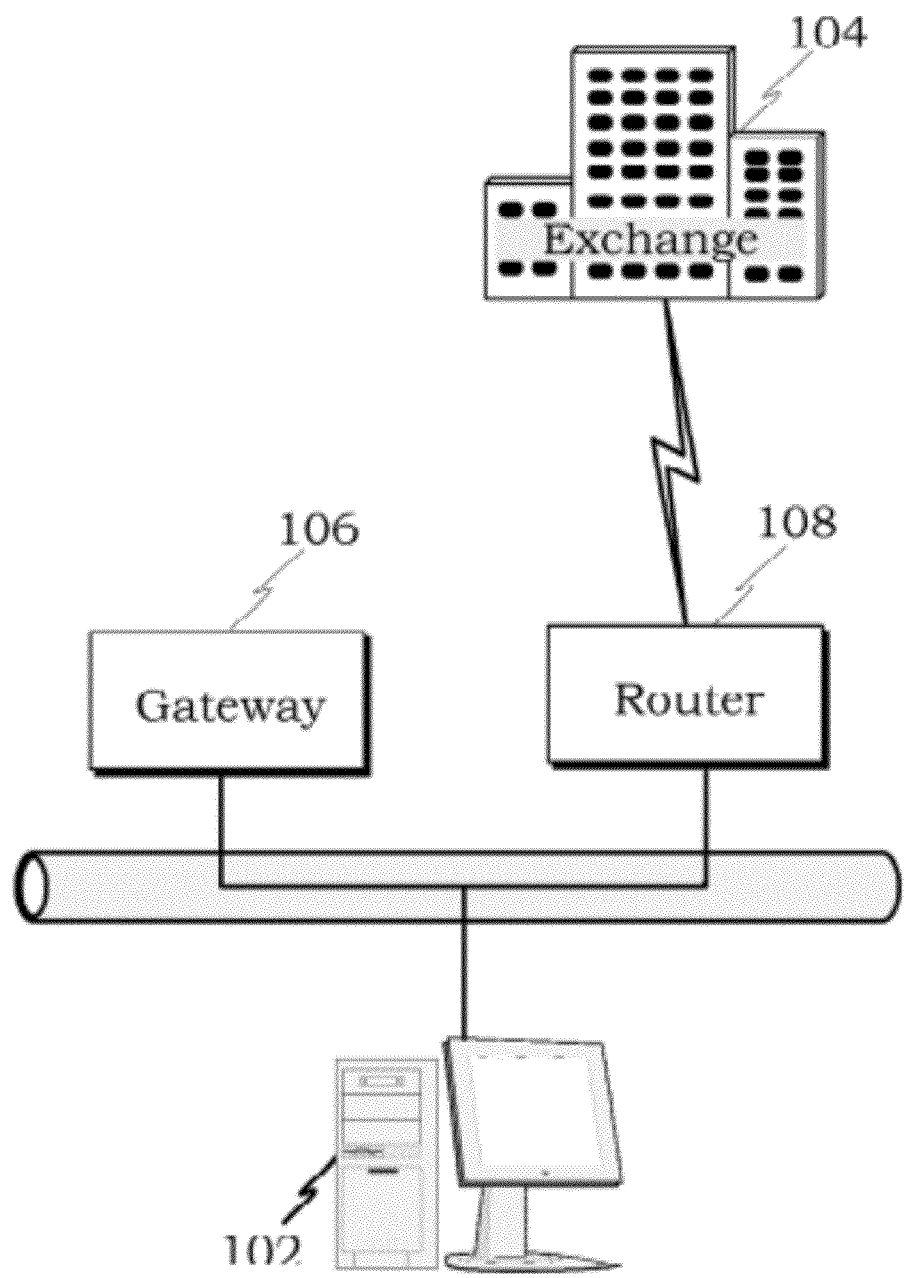
FIG. 1 illustrates an example electronic trading system in which the example embodiments may be employed.

FIG. 1 illustrates an example electronic trading system in which the example embodiments may be employed. However, it should be understood that the example embodiments could be equally applicable in different embodiments and in relation to different systems as well, such as by other computer programs or systems that do not necessarily relate to electronic trading (e.g., operating systems, gaming systems, and/or other software applications). In this example, the trading system comprises a client device 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the client device 102 with orders from other client devices (not shown). The electronic exchange 104 may list one or more tradable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the types of order execution algorithms used, the electronic exchange 104 provides market information to the subscribing client device 102. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually, although not necessarily, provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchange 104 can offer other types of market information such as the last traded price (LTP), the last traded quantity (LTQ), and order fill information.

The computer employed as the client device 102 generally can range from a hand-held device, laptop, or personal computer to a larger computer such as a workstation with multiple multiprocessors. An illustrative personal computer may use Pentium™ microprocessors and may operate under a Windows operating system, or yet may use some other microprocessor or operating system. Generally, the client device 102 includes a monitor (or any other output device) and an input device, such as a keyboard, a trackball, and/or a two or three-button mouse to support click based trading, if so desired. One skilled in the art of computer systems will understand that the present example embodiments are not limited to any particular class or model of computer employed for the client device 102 and will be able to select an appropriate system.

The computer employed as the gateway 106 generally can range from a personal computer to a larger or faster computer. An illustrative gateway 106 computer may use Pentium™ microprocessors and may operate under a Windows (server or workstation) operating system, or yet some other system. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a client device or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

In general, it should be understood that the devices described herein could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data.

It should also be noted that the client device 102 generally executes application programs resident at the client device 102 under the control of the operating system of the client device 102. Also, the gateway 106 executes application programs resident at the gateway 106 under the control of the operating system of the gateway 106. In other embodiments and as understood by a person skilled in the art, the function of the application programs at the client device 102 may be performed by the gateway 106, and likewise, the function of the application programs at the gateway 106 may be performed by the client device 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN. In yet another example illustration, the gateway may be housed at, or near, its corresponding electronic exchange. According to this instance, the client device may communicate with the gateway over a wide area network or through the use of a T1, T3, ISDN, or some other high speed connection.

Further, the gateway may be located remote from the client device and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

II. A Second Example Trading System

Figure 2:
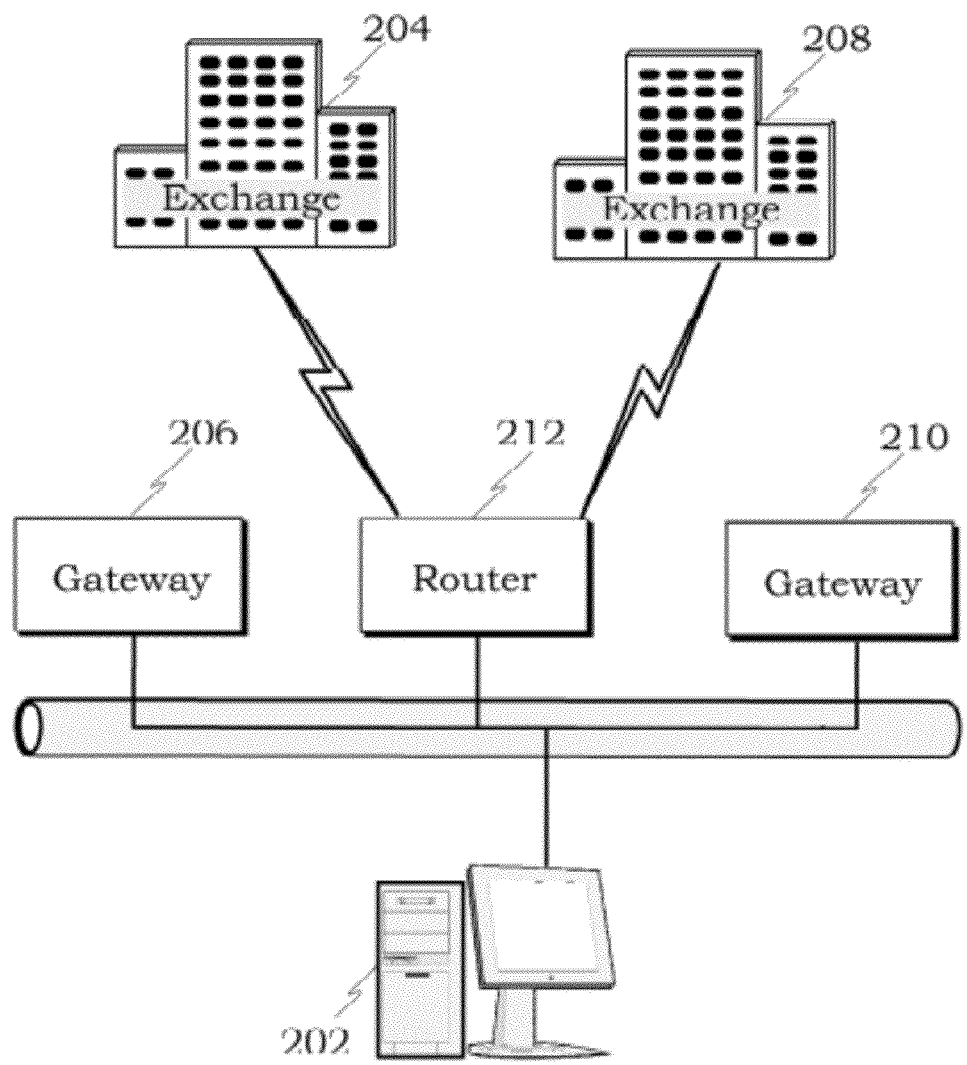
FIG. 2 illustrates another example trading system that uses similar computer elements as shown in FIG. 1, in which, the example embodiments may be employed to trade at multiple electronic exchanges.

FIG. 2 illustrates another example trading system that uses similar computer elements as shown in FIG. 1, in which a trader may access and trade at multiple electronic exchanges. The system comprises a client device 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradable objects listed at different electronic exchanges. To some traders, there can be many advantages with a multi-exchange environment. For example, a trader could view market information from each tradable object through one common visual display. As such, price and quantity information from the two separate exchanges may be presented together so that the trader can view both markets simultaneously in the same window. In another example, a trader can spread trade different tradable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, client devices, routers, or other computers serving various functions like message handling and security). Additionally, several networks, like either of the networks shown in FIG. 1 or FIG. 2, may be linked together to communicatively access one or more electronic exchanges.

III. Client Device

Client devices 102 and 202 can be computers, such as a workstation, desktop, laptop, handheld device, and so forth, that allow a trader to trade one or more tradable objects that are offered at exchange(s). A client device may include at least processor and memory. Preferably, the processor has enough processing power to handle and process various types of market information. The more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, a RAM, a PROM, an EPROM, a FLASH-EPROM, and any other memory chip or cartridge, or any other medium from which a computer can read.

When a client device receives market information or other data, such as news, or charting data, and order related information from an exchange, the received information may be displayed to the trader(s) on the visual output device or display device. However, it should be understood that the information could be provided to a trader using other means such as sound. The output device can be any display device. For example, the display could be a CRT-based video display, an LCD-based or a gas plasma-based flat-panel display, a display that shows three-dimensional images, or some other type of display.

Upon viewing the market information or a portion thereof, a trader may wish to send orders to an exchange, cancel orders, change orders, query an exchange, and so on. To do so, the trader may input various commands or signals into a client device such as by typing into a keyboard, inputting commands through a mouse, or inputting commands or signals through some other input device. For instance, a trader may click a mouse button to initiate an order to buy a particular quantity of the tradable object at a particular price. Then, a client device preferably generates transaction information. There are many different types of messages and/or order types that can be submitted, all of which may be considered various types of transaction information. Once generated, transaction information is sent from a client device to one or more host exchanges over communication links.

In one example embodiment, a client device uses software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a client device could run automated types of trading applications.

While the example embodiments could be implemented in relation to many different environments and many different applications, they will be described in relation to a trading application and a trading screen. Details regarding the trading screen are not necessary to understand the present invention. However, for illustrative purposes, one type of trading screen that can be used is provided by a commercially available trading application referred to as X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale. Portions of the X_TRADER® and the MD Trader™-style display are described in U.S. Pat. No. 6,772,132, entitled "Click Based Trading With Intuitive Grid Display of Market Depth," filed on Jun. 9, 2000; U.S. Pat. No. 6,938,011, entitled "Click Based Trading with Market Depth Display" filed on Jun. 9, 2000; U.S. Pat. No. 7,127,424 entitled "Click Based Trading With Intuitive Grid Display of Market Depth and Price Consolidation," filed on Oct. 5, 2001; U.S. patent application Ser. No. 10/125,894, entitled "Trading Tools For Electronic Trading," filed on Apr. 19, 2002, which issued as U.S. Pat. No. 7,389,268 on Jun. 17, 2008; and U.S. patent application Ser. No. 10/376,417, entitled "A System and Method for Trading and Displaying Market Information in an Electronic Trading Environment," filed on Feb. 28, 2003, which issued as U.S. Pat. No. 7,228,289 on Jun. 5, 2007, the contents of each are incorporated herein by reference. However, it should be understood that orders in the system illustrated in FIGS. 1 and 2 could also be placed using any other trading application as well. Additionally, the preferred embodiments are not limited to any particular product that performs translation, storage, and display function.

IV. An Example Method Overview

Some existing applications enable traders to track orders related to specific trading strategies with inter-process communication by adding order tracking functionality to the applications that generate the orders. However, such a method is extremely limiting since the only application that can track orders and obtain desired order data is the application that generates the orders. Alternatively, to obtain desired order data, another application could potentially communicate and obtain access to an order database of each application that generated desired orders. However, each application may be programmed to use its own proprietary tracking system. Also, the process of searching for desired orders often requires complicated analysis and could potentially be impossible due to the limitations built into the sending applications.

The example methods described herein provide a method for assigning order descriptors to orders being entered in an electronic trading environment. As will be described in greater detail below, the order descriptors specify the purpose of each order, (e.g., a hedge order that was sent out in response to a fill in a leg of a spread), and are included in the order fields. By including the order descriptors in the order itself, the order descriptors are accessible globally by an application that generated the order as well as other applications that could use the descriptors for either order management or post-trade analysis. According to the example embodiments described below, when any interested application detects an order that includes order descriptor identifiers, the application can read the order descriptor identifiers included in the order and manage or analyze the order.

The following method provides an example application of the example embodiments in relation to hedge orders that are sent for a spread trading strategy. However, it should be understood that the order descriptors described herein could be used in relation to many other orders or trading strategies as well. Also, it will be assumed that when using an automated spread trading tool, once an order in one leg is matched, the automated spread tool automatically offsets the filled order with a second order, i.e., a hedge order, which is sent to the offsetting side (e.g., a second leg or opposite side of the market). This quick action in a conventional sense is sometimes referred to as "fire and forget." If a spread consists of more than two legs, then a different offsetting order might be sent to each of the offsetting legs. In the interest of clarity, the description of the example methods assumes that the spread is made up of two legs, and that the price of the first order in the first leg (e.g., the non-hedging side) is based on the price at which the second order would get filled in the second leg (e.g., the hedging side), thereby achieving a certain spread price. The process can be easily adapted by one of skill in the art upon reading this description to implement spreads with more than two legs. In addition, there are many other ways to configure the spread than what is described in this example, which are known by one of ordinary skill in the art.

Figure 3:
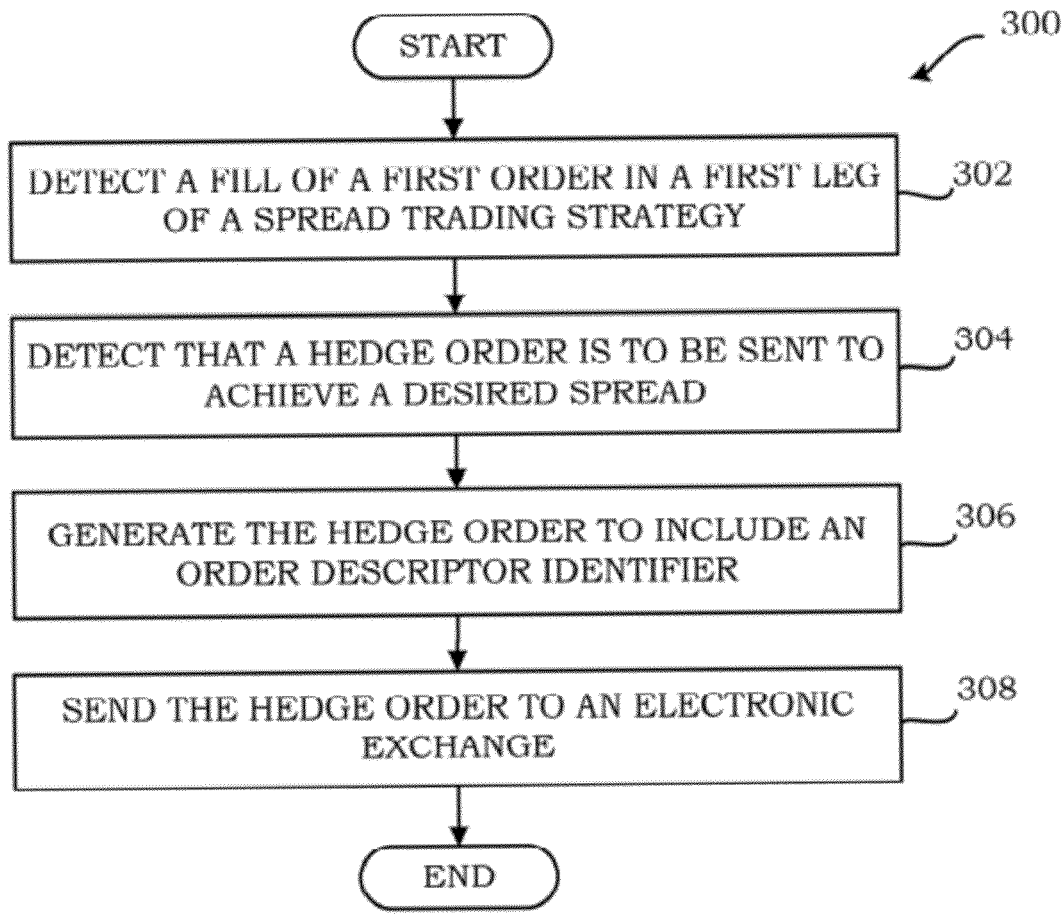
FIG. 3 is a flow diagram illustrating one example method for using order descriptor identifiers in relation to a spread trading strategy.

FIG. 3 is a flow chart showing an example method 300 for assigning order descriptors to a hedge order. It should be understood that each block in FIG. 3 may represent a module, segment, or portion of code, which includes one or more executable instructions for implementing specific logical functions or steps in the process. Alternate implementations are included within the scope of the preferred embodiments in which functions may be executed out of order from that shown or discussed, including substantially concurrently or in reverse order, depending on the functionality involved, as would be understood by those reasonable skilled in the art. Further, it is understood that some steps may not need to be implemented to achieve the desired result.

At step 302, a fill is detected of an order corresponding to a first leg of a spread trading strategy. The fill corresponds to a first tradable object being traded at an electronic exchange. At step 304, a sending application, such as an automatic spread trading application, determines that a hedge order is to be sent in response to detecting the fill in the first leg of the spread trading strategy.

At step 306, the sending application generates the hedge order, and the generated hedge order includes an order descriptor that defines the purpose of the hedge order. As described earlier, the sending application may determine order parameters for the hedge order, such as a hedge order price, so that when the hedge order gets filled, it achieves a spread price defined for the spread trading strategy. It should be understood, and as will be described in greater detail below, the order descriptor identifiers could take many different formats ranging from a single identifier to detailed data that identifies the purpose of the hedge order and specifies the fill or the spread that initiated the hedge order.

According to one example embodiment, the order descriptor identifiers are included in each order's agile data, e.g., data in optional order fields of an order message. Alternatively, the order descriptor identifiers could be placed in some other order fields that can be globally accessible and recognizable by not only the sending application but also any user-created applications or some other applications external to the sending application. As will be described in greater detail below, the descriptor identifiers may specify a flag identifying the order as a hedge order, a spread identifier, an identifier of the order that initiated the hedge order, as well as other spread data, if so desired. It should be understood that the descriptor data may include a number of identifiers or flags, such as spread identifiers, and the identifiers or flags may be configured to further map to more detailed data related to the spread or yet some other trading strategy. It should be understood that those skilled in the art will understand that there are many different ways to convey the desired information in the order, and the complexity of order descriptors can vary based on the system settings or user's preferences.

At step 308, the hedge order including the order descriptor identifiers/data is sent by the sending application to an electronic exchange, and the method 300 terminates. It should be understood that the order descriptor identifiers can be removed at a gateway before the order is sent to an electronic exchange so that the gateway may manage the association of the hedge order with the specific order descriptor identifiers.

According to another example embodiment, rather than generating a new hedge order upon detecting the fill, there may be an order already pending at the desired price, and the pending working order could be converted and used as a hedge order. One example method and system for smart hedging is described in the commonly assigned U.S. patent application Ser. No. 11/241,716, "System and Method for Smart Hedging in an Electronic Trading Environment," filed on Sep. 30, 2005, which issued as U.S. Pat. No. 7,747,510 on Jun. 29, 2010, the contents of which are incorporated herein by reference.

In such an embodiment, while the working order is logically converted by the system to a hedge order, a change order request is sent for the order to insert hedge order descriptor identifiers. It should be understood that the change order request may be either sent to an electronic exchange via a gateway or only to the gateway, depending on the system configuration. According to one example embodiment, agile data, e.g., optional data, corresponding to orders that are sent to an exchange is distributed to clients by gateways, while the agile data is not sent to an exchange. In such an embodiment, the change order request includes a request to modify agile data for an order and the request is sent to a gateway only. Upon detecting the request, the gateway then distributes the new agile data corresponding to the order to the subscribing applications and client terminals. Such an embodiment would allow for adding or changing an order descriptor identifier without the need to send an order change request to an electronic exchange. According to one example embodiment, an order change request, along with order descriptor identifiers, could include a data string, such as, for example, an "order_action=TT_ORDER_ACTION_UPDATE and hints=HINT_TTONLY" so that a gateway can recognize the update as an internal system update and does not forward the update to an electronic exchange.

V. Order Descriptor Application and Identifiers

Figure 4:
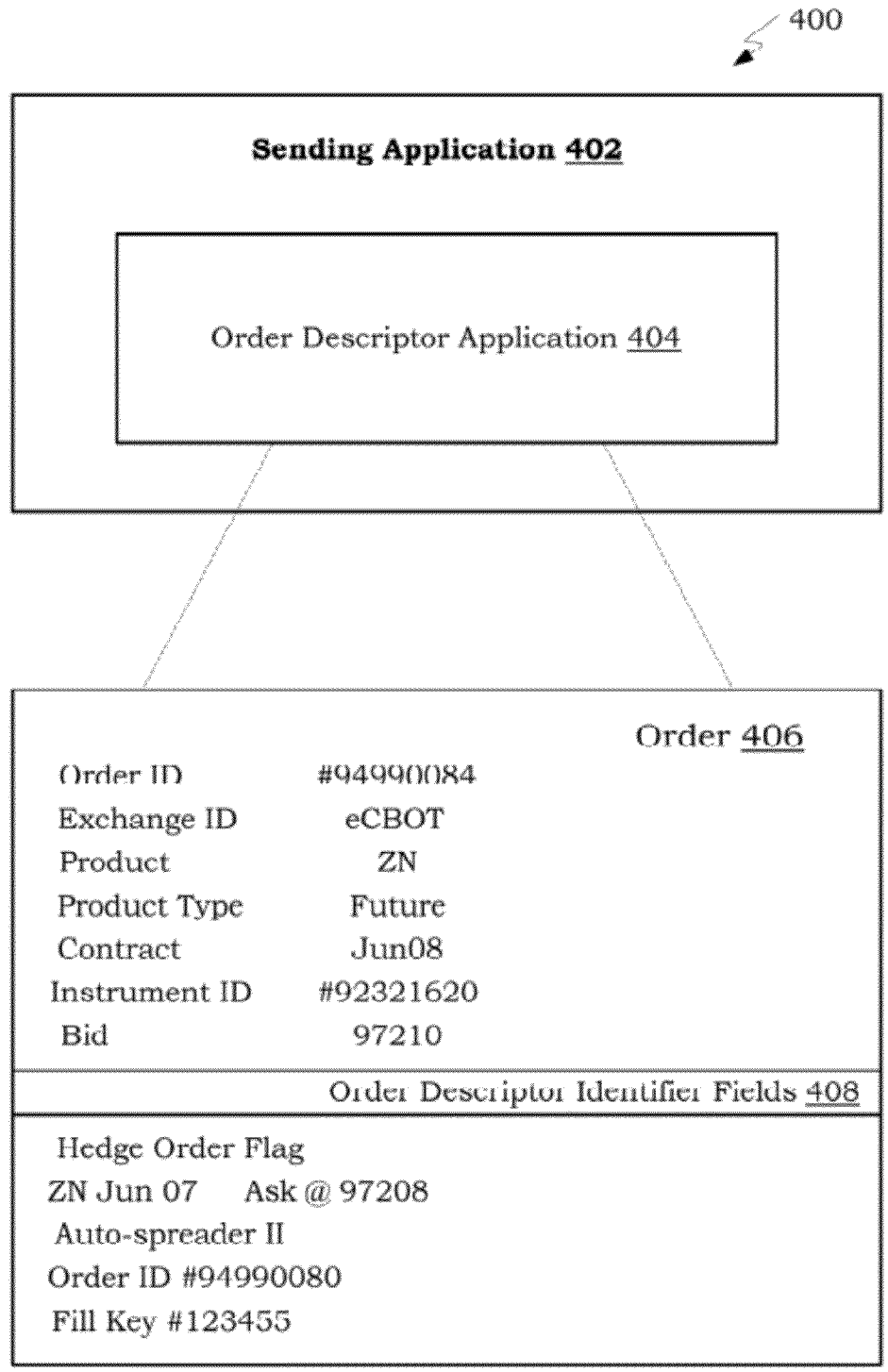
FIG. 4 is a block diagram illustrating a system for inserting order descriptor identifiers and an example format of an order with order descriptor identifiers fields.

As mentioned earlier, the order descriptors could take many different formats. FIG. 4 is a block diagram 400 illustrating an example block diagram of an application for creating order descriptor identifiers as well as an example format of an order with an example set of descriptor identifiers.

FIG. 4 illustrates a sending application 402 including an order descriptor application 404. According to one example embodiment, the sending application 402 is any application that sends orders related to any trading strategy or a set of linked orders. The sending application 402 may be located on a client site or a network entity in communication with the client site. While the example embodiments focus on the spread trading strategy and automated spread trading applications, it should be understood that the example embodiments are equally applicable in relation to other automated or manual applications/strategies. Among others, the sending application may be configured to send timed orders, synthetic orders, order cancel orders ("OCOs"), market making orders, arbitrage orders, or other orders upon detecting a certain market related or news related events, just to name a few. Additionally, the sending application could include an automatic trading application, such as the one described in the commonly assigned U.S. patent application Ser. No. 10/284,584, entitled "System and Method for Automated Trading" filed on Oct. 31, 2002, which published as U.S. Patent Application Publication No. 2003/0236737 on Dec. 25, 2003, the contents of which are incorporated herein by reference. In relation to any auto-trader applications, the order descriptors, among other data, could identify a trading strategy that originated the order.

FIG. 4 also illustrates an example format of an order ticket/message 406 that can be created by the order descriptor application 404. The order ticket 406 includes an order identifier that corresponds to either application-specific order identifier or an order identifier assigned by an electronic exchange once the order is successfully sent to the exchange. Then, the order ticket 406 includes an exchange identifier, a product identifier, a product type identifier, a contract identifier, an instrument identifier, and an identification whether the order is a bid or sell order. It should be understood that fewer or additional identifiers could also be used depending of the system configuration.

The order ticket 406 also includes order descriptor fields 408. As explained earlier, the order descriptor fields 408 define the order's purpose as well as an application/strategy from which the order originated. As shown in the order descriptor fields 408, the order is a hedge order that was originated by an auto-spreader application I. The fields 408 also specify an order identifier corresponding to an order that was filled and initiated the hedge order, as well as an identifier of a tradable object corresponding to the filled order and a price at which the order was filled. Additionally, the order descriptor fields 408 include a fill key identifier to uniquely associate the hedge order with the fill that triggered the hedge order. It should be understood that parameters illustrated in the order descriptor fields 408 are only examples and different, additional, or fewer parameters could also be used. For example, in relation to spread strategies, additional spread data may be specified, such as a desired spread price, any additional legs of the spread, a time at which the originating order was filled, etc. Those skilled in the art will understand that many additional or different implementations are possible as well. Also, for space saving purposes, rather than providing specific data in the order descriptor fields, single identifiers could be used to enable a trader to access more detailed information at some other external storage.

While the example embodiments described above focus on automated trading application automatically including order descriptors in an order, it should be understood that the example embodiments are not limited to the automated trading tools and that the order descriptor identifiers could be used in relation to orders that are entered manually as well. According to one example embodiment, with respect to orders that are entered manually, a drop down menu could be provided to a user to mark an order with order purpose identifiers before or after the order is submitted to an electronic exchange. In such an embodiment, an order marking application could be added to a trading application or could take a format of a module of any add-on application that is programmed to allow a user to mark orders according to the methods described herein.

In the manual marking method, once a user marks an order with order descriptor identifiers, the attached information will be included in the order fields and will be globally accessible by many different applications similarly to other order parameters included in the order. It should be understood that a user could also use the same manual methods to change or remove the order descriptor identifiers from any working or filled orders.

It should be understood that the order descriptor application 404 may be programmed to automatically provide globally defined descriptor identifiers that could be used for marking orders. Additionally, for example, in relation to hedge orders, the order marking application may access automated spread trading applications that are used by a trader for trading spreads. In such an embodiment, upon receiving spread data from the automated spread trading application, the order marking application may provide easily selectable order descriptor identifier options generated based on the received data. It should be understood that many different types of interfaces for manual marking of orders could be used including graphical user interfaces with pull down menus, selection options, etc., command line interfaces, touch-screen interfaces, the combination thereof, or yet some other interfaces currently available or later developed.

VI. Order Management Using Order Descriptors

Figure 5:
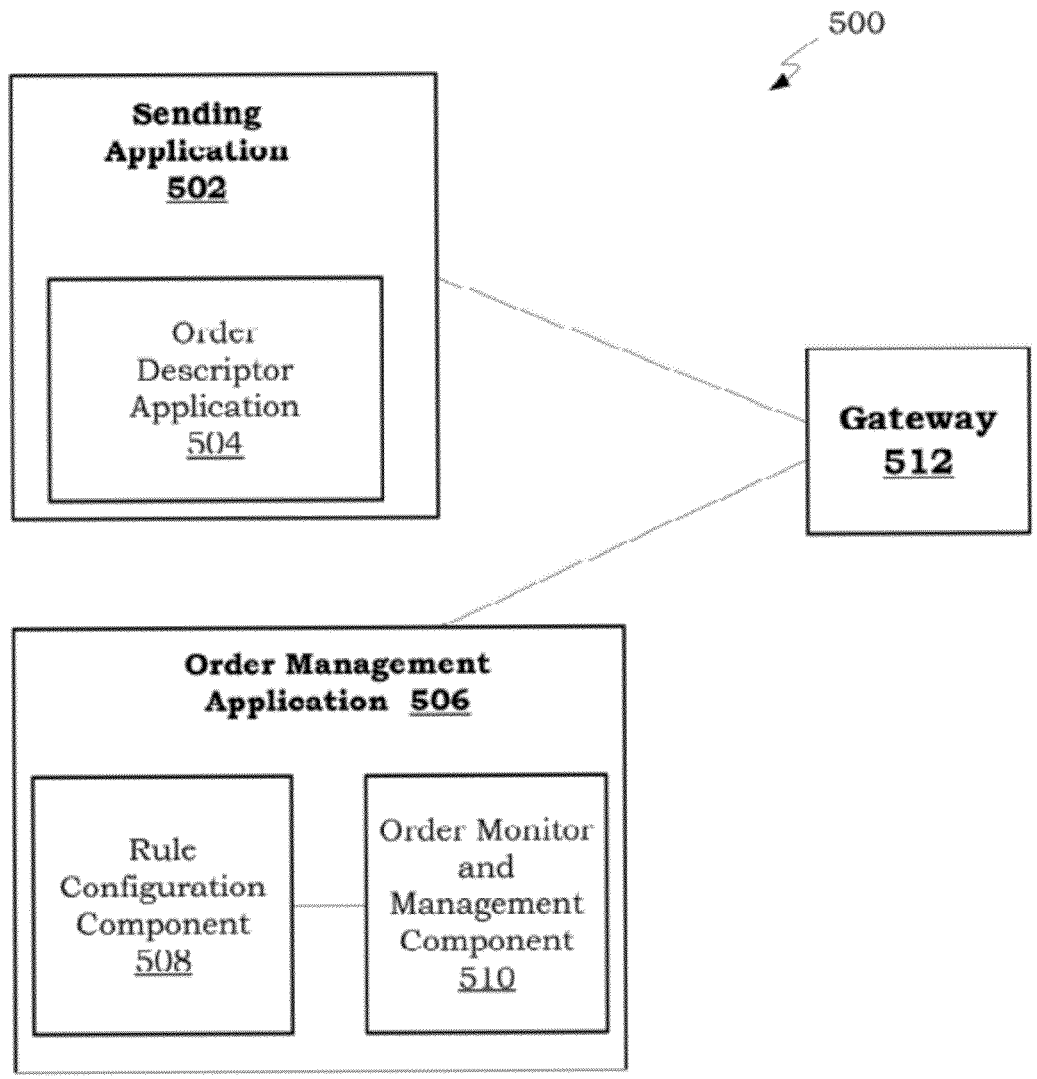
FIG. 5 is a block diagram illustrating an example system for order management using order descriptor identifiers.

According to one example embodiment, the order descriptor identifiers are used for order management once an order is submitted to an electronic exchange. FIG. 5 is a block diagram illustrating an example system 500 for order management of orders having order descriptor identifiers according to one example embodiment. The system includes a sending application 502 and an order descriptor application 504 that were described in greater detail in relation to FIG. 4. Additionally, the system 500 includes an order management application 506. As shown in FIG. 5, the sending application 502 and the order management application 506 are in communication with a gateway 512. While a single gateway is illustrated, it should be understood that the applications could be in communication with multiple gateways as well. According to one example embodiment, any time the sending application 502 sends an order, the gateway 512 forwards the order to an electronic exchange. Upon receipt of the order by the exchange, the exchange then sends an order confirmation data for the order to the gateway 512. The gateway 512 then processes the received data and distributes the processed data to network and client entities that have subscribed to data feeds containing order information.

According to the embodiment illustrated in FIG. 5, the sending application 502 as well as the order management application 506 could receive order data feeds that are provided by the gateway 512. In such an embodiment, the order management application 506 monitors the received order data for orders having order descriptor identifiers and takes different actions in relation to the marked orders based on specified order management rules. Additionally, it should be understood that the order management application 506 could monitor order data not only based on order data provided by the gateway. In an alternative embodiment, the order management application 506 could have access to order data before the order data is received at the gateway 512.

It should be understood that while the sending application 502 and the order management application 506 are illustrated as two separate applications, the order management application 506 could be an internal module of the sending application 502 as well. Additionally, while not shown, the applications 502 and 506 may be located on the same or different network entities or client devices. Those skilled in the art will understand that many different configurations are possible as well.

To manage orders having order descriptor identifiers, a user may configure a number of order management rules via a rule configuration component 508. Alternatively, some or all rules could be hard-coded. For example, with respect to hedge orders, an order management rule may be specified that causes the order management application 506 to monitor any orders with hedge order descriptor identifiers, and to alert a user after a predetermined time period of any unfilled hedge orders. Effectively, as a hedge order is sent by the sending application 502, the order management application 506 determines that a new hedge order was sent by monitoring the order data either before or after the orders are submitted to an electronic exchange, and searching for orders having hedge order descriptor identifiers.

Upon detecting a new hedge order, an order monitor and management component 510 of the order management application 506 may start a timer for the newly detected hedge order. When the timer expires, e.g., as no fill information is received from an electronic exchange for the hedge order, the order monitor and management application 510 may alert a user and/or automatically take some other preconfigured actions on behalf of the user. For example, upon detecting no fill during a predefined time period, the order monitor and management application 510 may be programmed to modify the price of the pending hedge order, such as by setting a pay-up tick, in relation to the order. In such an embodiment, the order monitor and management application 510 sends a request to modify or cancel-and-replace the pending hedge order to an electronic exchange at which the order was initially submitted. Alternatively, the application 510 could communicate with the sending application 502, and the sending application 502 cancels and/or replaces the existing order with a new hedge order. It should be understood that rather than automatically taking an action on behalf of a user, the order management application 506 may display the hedge order information and allow the user to select a new order price, or to define some other order parameters or actions to be taken in relation to the pending hedge order.

It should be understood that the order management application 506 may provide a graphical user interface to allow for order management during a trading day. For example, according to one example embodiment, the order management application 506 automatically tracks automatic trading applications or trading strategies that are used by a trader during a trading day. Then, a trader is allowed to selectively view the status of all orders that were entered with respect to a specific application or a trading strategy. In such an embodiment, a trader may, for example, select a desired trading strategy and then request to view all unfilled orders or yet some other set of orders pulled based on yet another condition. With respect to a spread trading strategy, a trader could view all un-hedged spread orders grouped based on the initial fills that originated each hedge order. It should be understood that additional computations could be performed to assist a trader with making his decisions with respect to unfilled hedge orders. For example, a value corresponding to the current give-up/edge price determined based on the initial fill price and the current market conditions could be displayed in relation to each unfilled hedge position.

The order management and analysis tools using the order descriptor identifiers could be very valuable for system administrators as well. While the embodiment described above focused on order analysis being done by traders, the same analysis may be provided by allowing a system administrator to search for certain orders that were entered by a group of individual traders. For example, a system administrator could view all orders of traders having unhedged positions, e.g., any working or delete hedge orders. Such functionality would be especially useful in assessing the risk for each individual trader as well as for a group of traders.

VII. Post-Trade Analysis Using Order Descriptors

In addition to order management, the order descriptors could also be very valuable for post-trade analysis. Currently, as described briefly before, when an auto-spreader application or an auto-trader application sends an order as a result of a fill in another order, it is just another order since there is no link to the fact that it was sent upon an event of a fill in the same or different tradable object. According to the example embodiment described above, the descriptor identifiers enable a trader or trade analysis applications to pull desired orders from the stored pool of order fills, cancelled orders, modified orders, etc., stored in the order books or yet some other databases, and perform a desired analysis.

Once again, the description related to the post-trade analysis will focus on hedge orders; however, as explained above, the example embodiments are not limited to hedge orders and could be equally applicable to other orders as well that were either manually entered by a trader or by automatic trading applications. According to one example embodiment, a trading analysis application is programmed to search for specific orders by searching for order parameters including order descriptor identifiers. For example, a trader may wish to determine at what price level a specific hedge order got filled. Using the hedge order descriptor identifiers containing a specific name of a spread and a hedge order flag, the application searches the order fills for the desired information. Such information could be especially useful for traders who set up their spread trading strategies to use pay-up ticks so that their hedge orders potentially get filled at prices in a range of prices defined by the pay-up ticks. Also, once the price of a hedge order is known, the actual spread price can be computed, so that the trader can, among other things, determine whether the trader actually 'paid-up' to achieve the desired spread.

Additionally, a trader or a system administrator could perform many statistical analyses using the order descriptor identifiers. Currently, traders can view their overall P/L and positions but have no idea as to what actually happened with respect to each order combination that was fired up for a spread or some other trading strategy. Using the order descriptor identifiers and performing per-trade analysis, a trader could decide that there is a higher risk involved with respect to trading a certain trading strategy as compared to another strategy. For example, a trader may determine an average time it takes a combination of orders to achieve a desired spread at a specific electronic exchange. Then, if more than one electronic exchange provides the same spread, a trader may decide to trade on the one that provides the quickest fills. Also, data corresponding to spread orders could be used to determine a percentage of how many times a trader gets legged with respect to a specific spread strategy, a tradable object, or an exchange that allow for trading the spread. Also, as an example, similar analysis may be performed to determine how often and with respect to which trading strategies a trader ended up using pay-up ticks to achieve the desired fills. Such analysis could be very useful to many traders, as the traders can adjust their trading strategies or even decide not to trade certain spreads based on the performed analyses. Those skilled in the art will understand that different analyses could be performed as well, and the described embodiments are only examples intended to illustrate a few of many benefits of the order descriptor identifiers.

It will be apparent to those of ordinary skill in the art that methods involved in the system and methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method for trade order management in an electronic trading environment, comprising:

generating by a computing device an order message by a first software application for a first trade order to buy or sell a tradeable object at an electronic exchange in response to detecting a fill of a second trade order, the first trade order having an order quantity and an order price;

inserting by the computing device an order descriptor identifier into the generated order message, wherein the order descriptor identifier comprises information that links the first trade order to the fill of the second trade order; and using by the computing device the order descriptor identifier to create an association between the first trade order and the fill of the second trade order, wherein the order descriptor identifier is accessible by a second software application that is different from the first software application.

2. The method of claim 1, wherein the first trade order and the second trade order are generated based on a trading strategy.

3. The method of claim 2, further comprising:
defining the trading strategy.

4. The method of claim 2, wherein the order descriptor identifier further comprises information that identifies the trading strategy.

5. The method of claim 4, wherein the order descriptor identifier further comprises information that identifies the trading strategy as an automated trading strategy.

6. The method of claim 4, wherein the order descriptor identifier further comprises information that identifies the trading strategy as a manual trading strategy.

7. The method of claim 2, wherein the trading strategy comprises a spread trading strategy.

8. The method of claim 1, wherein the order descriptor identifier comprises information identifying the first trade order as a hedge order.

9. The method of claim 1, wherein the second trade order is to buy or sell the tradeable object.

10. The method of claim 1, wherein the second trade order is to buy or sell a second tradeable object that is different than the tradeable object.

11. The method of claim 1, wherein the order descriptor identifier is accessible by the first software application.

12. The method of claim 1, further comprising:
sending the order message comprising the order descriptor identifier to an electronic exchange.

13. A nontransitory computer readable medium having stored therein instructions executable by a processor, wherein the instructions are executable to:
generate an order message by a first software application for a first trade order to buy or sell a tradeable object at an electronic exchange in response to detecting a fill of a second trade order, the first trade order having an order quantity and an order price;
insert an order descriptor identifier into the generated order message, wherein the order descriptor identifier comprises information that links the first trade order to the fill of the second trade order; and
use the order descriptor identifier to create an association between the first trade order and the fill of the second trade order, wherein the order descriptor identifier is accessible by a second software application that is different from the first software application.

14. The computer readable medium of claim 13, wherein the first trade order and the second trade order are generated based on a trading strategy.

15. The computer readable medium of claim 14, wherein the instructions are further executable to:
define the trading strategy.

16. The computer readable medium of claim 14, wherein the order descriptor identifier further comprises information that identifies the trading strategy.

17. The computer readable medium of claim 16, wherein the order descriptor identifier further comprises information that identifies the trading strategy as an automated trading strategy.

18. The computer readable medium of claim 16, wherein the order descriptor identifier further comprises information that identifies the trading strategy as a manual trading strategy.

19. The computer readable medium of claim 14, wherein the trading strategy comprises a spread trading strategy.

20. The computer readable medium of claim 13, wherein the order descriptor identifier comprises information identifying the first trade order as a hedge order.

21. The computer readable medium of claim 13, wherein the second trade order is to buy or sell the tradeable object.

22. The computer readable medium of claim 13, wherein the second trade order is to buy or sell a second tradeable object that is different than the tradeable object.

23. The computer readable medium of claim 13, wherein the order descriptor identifier is accessible by the first software application.

24. The computer readable medium of claim 13, wherein the instructions are further executable to:
send the order message comprising the order descriptor identifier to an electronic exchange.

* * * * *

UNITED STATES PATENT AND TRADEMARK OFFICE
CERTIFICATE OF CORRECTION

PATENT NO. : 8,290,851 B2  
APPLICATION NO. : 12/844645  
DATED : October 16, 2012  
INVENTOR(S) : Deitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 87 days.

Signed and Sealed this  
Fifth Day of March, 2013

Teresa Stanek Rea  
*Acting Director of the United States Patent and Trademark Office*